(12) United States Patent
Jiang

(10) Patent No.: US 12,513,749 B2
(45) Date of Patent: Dec. 30, 2025

(54) RANDOM ACCESS METHOD, CONFIGURATION INDICATION METHOD AND ELECTRONIC DEVICE

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 443 days.

(21) Appl. No.: 18/003,736

(22) PCT Filed: Jul. 31, 2020

(86) PCT No.: PCT/CN2020/106120
§ 371 (c)(1),
(2) Date: Dec. 29, 2022

(87) PCT Pub. No.: WO2022/021292
PCT Pub. Date: Feb. 3, 2022

(65) Prior Publication Data
US 2023/0262776 A1 Aug. 17, 2023

(51) Int. Cl.
*H04W 74/0833* (2024.01)
(52) U.S. Cl.
CPC ............... *H04W 74/0833* (2013.01)
(58) Field of Classification Search
None
See application file for complete search history.

(56) References Cited

U.S. PATENT DOCUMENTS

| 10,547,374 | B1* | 1/2020 | Liu | H04W 28/0278 |
| 2007/0149206 | A1* | 6/2007 | Wang | H04W 56/0045 455/450 |
| 2013/0258956 | A1* | 10/2013 | Dinan | H04W 52/242 370/329 |
| 2013/0258957 | A1* | 10/2013 | Dinan | H04W 74/0833 370/329 |

(Continued)

FOREIGN PATENT DOCUMENTS

| CN | 108513359 A | 9/2018 |
| CN | 108633050 A | 10/2018 |

(Continued)

OTHER PUBLICATIONS

ISA State Intellectual Property Office of the People's Republic of China, International Search Report Issued in Application No. PCT/CN2020/106120, Apr. 28, 2021, WIPO, 5 pages.

(Continued)

*Primary Examiner* — Faiyazkhan Ghafoerkhan
(74) *Attorney, Agent, or Firm* — Volpe Koenig

(57) ABSTRACT

The present disclosure relates to a random access method, a configuration indication method and an electronic device. The random access method includes: initiating random access based on first random access configuration information in response to autonomous determination of timing advance by the terminal, initiating random access based on second random access configuration information in response to non-autonomous determination of timing advance by the terminal; the first random access configuration information is different from the second random access configuration information.

16 Claims, 3 Drawing Sheets

It is determined, according to broadcast signaling and/or Radio Resource Control signaling sent by the base station, that random access is initiated based on first random access configuration information when the terminal determines timing advance autonomously; and/or, it is determined, according to broadcast signaling and/or Radio Resource Control signaling sent by the base station, that random access is initiated based on second random access configuration information when the terminal determines timing advance non-autonomously. — S102

In response to autonomous determination of timing advance by the terminal, random access is initiated based on first random access configuration information, and in response to non-autonomous determination of timing advance by the terminal, random access is initiated based on second random access configuration information; the first random access configuration information is different from the second random access configuration information — S101

(56) References Cited

U.S. PATENT DOCUMENTS

| | | | |
|---|---|---|---|
| 2013/0258958 A1* | 10/2013 | Dinan | H04W 52/0212 370/329 |
| 2013/0258959 A1* | 10/2013 | Dinan | H04W 74/0833 370/329 |
| 2013/0259008 A1* | 10/2013 | Dinan | H04L 27/2662 370/336 |
| 2013/0260735 A1* | 10/2013 | Dinan | H04W 56/0005 455/418 |
| 2015/0124787 A1* | 5/2015 | Dinan | H04W 74/0833 370/336 |
| 2015/0139140 A1* | 5/2015 | Dinan | H04L 27/2662 370/329 |
| 2015/0319786 A1* | 11/2015 | Dinan | H04W 52/146 370/329 |
| 2016/0112975 A1* | 4/2016 | Dinan | H04L 5/0085 370/350 |
| 2018/0332507 A1* | 11/2018 | Fujishiro | H04W 36/00692 |
| 2019/0229867 A1* | 7/2019 | Yi | H04L 5/0048 |
| 2019/0363843 A1* | 11/2019 | Gordaychik | H04W 28/16 |
| 2021/0235504 A1* | 7/2021 | Dinan | H04W 56/001 |
| 2022/0225292 A1* | 7/2022 | Mohammad Soleymani | H04L 1/0038 |
| 2022/0272760 A1* | 8/2022 | Murray | H04W 74/0836 |
| 2023/0076690 A1* | 3/2023 | Miao | H04B 7/18563 |
| 2023/0262776 A1* | 8/2023 | Jiang | H04W 56/0045 370/329 |

FOREIGN PATENT DOCUMENTS

| | | |
|---|---|---|
| CN | 111194080 A | 5/2020 |
| CN | 111247864 A | 6/2020 |
| CN | 112075108 A | 12/2020 |
| WO | 2019/231305 A1 | 12/2019 |

OTHER PUBLICATIONS

State Intellectual Property Office of the People's Republic of China, Office Action and Search Report Issued in Application No. 2020800016925, Nov. 19, 2021, 14 pages. (Submitted with Machine/Partial Translation).

CATT, "Discussion on Random Access Procedure for NTN", 3GPP TSG RAN WG2 Meeting #107bis, Chongqing, P.R. China, Oct. 14-18,2019, R2-1912159, Oct. 3, 2019, 8 pages.

Samsung, "Uplink timing advanceRACH procedure and Initial Access for NTN", 3GPP TSG RAN WG1 Meeting #99, Reno, USA, Nov. 18-22, 2019, R1-1912470, Nov.r 11, 2019, 12 pages.

* cited by examiner

S101: In response to autonomous determination of timing advance by the terminal, random access is initiated based on first random access configuration information, and in response to non-autonomous determination of timing advance by the terminal, random access is initiated based on second random access configuration information; the first random access configuration information is different from the second random access configuration information

Fig. 1

S102: It is determined, according to broadcast signaling and/or Radio Resource Control signaling sent by the base station, that random access is initiated based on first random access configuration information when the terminal determines timing advance autonomously; and/or, it is determined, according to broadcast signaling and/or Radio Resource Control signaling sent by the base station, that random access is initiated based on second random access configuration information when the terminal determines timing advance non-autonomously.

S101: In response to autonomous determination of timing advance by the terminal, random access is initiated based on first random access configuration information, and in response to non-autonomous determination of timing advance by the terminal, random access is initiated based on second random access configuration information; the first random access configuration information is different from the second random access configuration information

Fig. 2

S101: A time domain location of the second random access time domain resource is determined according to a time domain location of the first random access time domain resource and the first multiple and an offset.

S101: In response to non-autonomous determination of timing advance by the terminal, random access is initiated at the time domain location of the second random access time domain resource.

Fig. 3

S201: Indication information containing first random access configuration information and second random access configuration information is sent; the indication information is for instructing the terminal to initiate random access based on the first random access configuration information when the terminal determines timing advance autonomously, and to initiate random access based on the second random access configuration information when the terminal determines timing advance non-autonomously, and the first random access configuration information is different from the second random access configuration information.

Fig. 4

RANDOM ACCESS METHOD, CONFIGURATION INDICATION METHOD AND ELECTRONIC DEVICE

CROSS REFERENCE TO RELATED APPLICATIONS

This application is a U.S. national phase application of PCT Application No. PCT/CN2020/106120, filed on Jul. 31, 2020, the entire contents of which are incorporated herein by reference for all purposes.

TECHNICAL FIELD

The present disclosure relates to the field of communication technologies and, specifically, to a random access method, a configuration indication method, a random access apparatus, a configuration indication apparatus, an electronic device, and a computer-readable storage medium.

BACKGROUND

With the development of communication technologies, it is necessary to satisfy the requirement that a base station can communicate with a terminal at any position on the ground. However, since base stations in the network are currently located on the ground, there are many restrictions on settings for the base stations, and it is difficult to achieve the all-round coverage of the ground through the ground-located base stations, so a coverage with a satellite is also considered.

In a terrestrial network, a base station may send Timing Advance (TA) to a terminal, so as to make an uplink signal frame sent by the terminal corresponding to a downlink signal frame sent by the base station.

However, when communicating in a non-terrestrial network (NTN) in combination with a satellite, since the satellite moves at a high speed in space, a large delay may occur when the base station communicates with the terminal via the satellite, and the timing advance may also be large as it is set according to the delay, thereby causing certain problems.

SUMMARY

In view of the above, embodiments of the present disclosure provide a random access method, a configuration indication method, and an electronic device to solve technical problems in the related art.

According to a first aspect of the embodiments of the present disclosure, there is provided a random access method, being applied to a terminal, the method comprising: initiating random access based on first random access configuration information in response to autonomous determination of timing advance by the terminal, initiating random access based on second random access configuration information in response to non-autonomous determination of timing advance by the terminal. Wherein the first random access configuration information is different from the second random access configuration information.

According to a second aspect of the embodiments of the present disclosure, there is provided a configuration indication method, being applied to a base station, the configuration indication method comprising: sending indication information containing first random access configuration information and second random access configuration information to a terminal. Wherein the indication information is for instructing the terminal to initiate random access based on the first random access configuration information when the terminal determines timing advance autonomously, and to initiate random access based on the second random access configuration information when the terminal determines timing advance non-autonomously, the first random access configuration information being different from the second random access configuration information.

According to a third aspect of the embodiments of the present disclosure, there is provided an electronic device, comprising: a processor and a memory for storing processor-executable instructions. Wherein the processor is configured to implement operations comprising: initiating random access based on first random access configuration information in response to autonomous determination of timing advance by the terminal, initiating random access based on second random access configuration information in response to non-autonomous determination of timing advance by the terminal. Wherein the first random access configuration information is different from the second random access configuration information.

BRIEF DESCRIPTION OF THE DRAWINGS

In order to illustrate the technical solutions in the embodiments of the present disclosure more clearly, the accompanying drawings used for the description of the embodiments will be briefly described below. Obviously, the following drawings illustrate only certain embodiments of the present disclosure. For those of ordinary skill in the art, other drawings can be obtained from these drawings without creative labor.

FIG. 1 is a schematic flowchart illustrating a random access method according to an embodiment of the present disclosure.

FIG. 2 is a schematic flowchart illustrating another random access method in accordance with an embodiment of the present disclosure.

FIG. 3 is a schematic flowchart illustrating yet another random access method according to an embodiment of the present disclosure.

FIG. 4 is a schematic flowchart illustrating a configuration indication method in accordance with an embodiment of the present disclosure.

DETAILED DESCRIPTION OF THE EMBODIMENTS

Figure 5:
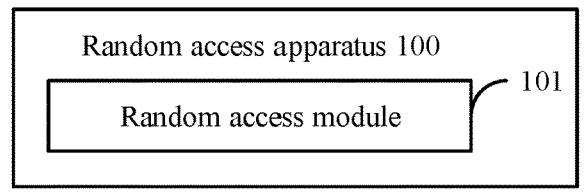
FIG. 5 is a schematic block diagram illustrating a random access apparatus according to an embodiment of the present disclosure.

The technical solutions in the embodiments of the present disclosure will be clearly and completely described below in conjunction with the accompanying drawings in the embodiments of the present disclosure. The described embodiments are only a part of the embodiments of the present disclosure, but not all of the embodiments. Based on the embodiments of the present disclosure, all other embodiments obtained by those of ordinary skill in the art without creative labor shall fall within the protection scope of the present disclosure.

FIG. 1 is a schematic flowchart illustrating a random access method according to an embodiment of the present disclosure. The method shown in this embodiment may be applicable to terminals in a non-terrestrial network, including but not limited to electronic equipment such as mobile phones, tablets, wearable devices, sensors, Internet of Things devices or the like. The terminal can serve as a user device which communicates with a base station, where the base station may be a ground-located base station in a non-terrestrial network, or space-located network device in the non-terrestrial network, such as a satellite, an aerial platform or the like. The following is mainly illustrated in the case that the network device is a satellite.

As shown in FIG. 1, the random access method may include the following steps, S101.

In step S101, in response to autonomous determination of timing advance by the terminal, random access is initiated based on first random access configuration information, and in response to non-autonomous determination of timing advance by the terminal, random access is initiated based on second random access configuration information. Additionally, the first random access configuration information is different from the second random access configuration information.

In the non-terrestrial network, it is necessary to send communication signals to the satellite no matter whether the terminal communicates with the ground-located base station, or with the satellite serving as the base station. Since the satellite is located in space, it takes a relatively long time for communication signals to be transmitted to the satellite, resulting in a large communication delay between the terminal and the base station, even reaching up to 541.46 ms in maximum.

In order to compensate the communication delay in the non-terrestrial network, the terminal can perform compensation based on timing advance in the process of communication, where there are mainly two ways for compensation as follows.

The first way is that the terminal determines timing advance autonomously, which is applicable to situations where the terminal can determine its own position. The terminal may calculate the delay to be compensated on the basis of the distance from the terminal to the satellite, which applies to the satellite regeneration mode in which the satellite serves as the base station; or the terminal may calculate the delay to be compensated on the basis of the distance from the terminal to the satellite as well as the distance or delay from the satellite to the base station, which applies to the situation where the base station is located on the ground.

The delay to be compensated, which is determined by the terminal, can be used as timing advance which may be reported to the base station in the process of random access, for example, carried in the Msg3 or MsgA in the process of random access. When the terminal communicates with the base station, it may compensate the total timing advance, or it can first receive the common timing advance broadcast by the network (which can be called common TA), and then perform partial compensation, that is, to compensate the difference between the total timing advance and the common timing advance.

The second way indicates that the terminal determines timing advance non-autonomously, which is applicable to situations where the terminal cannot determine its own position. The terminal may receive the common timing advance broadcast by the network, and then compensate the common timing advance when communicating with the base station, or the terminal may not compensate the common timing advance, but instead the network (for example the satellite) performs compensation for the common timing advance.

For example, the distance from the satellite to a ground reference point (which may refer to the projected position of the satellite on the ground) is d0, the distance from the satellite to the terminal is d1, the distance from the satellite to the base station is d0_F, and the speed of light is c. In the satellite regeneration mode, the common timing advance is equal to the two-way delay from the satellite to ground reference point, specifically equal to 2*d0/c; when the terminal communicates with the base station on the ground, the common timing advance is equal to the two-way delay from the satellite to the ground reference point plus the two-way delay from the satellite to the ground-located base station, specifically equal to 2*(d0+d0_F)/c.

Thus, it can be seen, the delays to be compensated by the terminal according to the above-mentioned two methods are different.

In a case where timing advance is determined autonomously, the terminal's position can be determined, thereby the timing advance determined thereunder is relatively accurate, and thus the compensated delay is also relatively accurate. Generally, it is guaranteed that the error between the actual delay and the compensated delay is within 1 ms.

In a case where timing advance is determined non-autonomously, since timing advance is not determined based on the position of the terminal, compensation is performed based on the common timing advance. The common timing advance does not include the distance d1 from the satellite to the terminal, but only the distance d0 from the satellite to the ground reference point, so that the error between the actual delay and the compensated delay is relatively large. This error is positively related to the difference between d1 and d0, and can even reach 20.6 ms for a cell covering a radius of 3500 km.

In order to compensate for the delay in the process of random access, the terminal needs to perform compensation according to the above-mentioned way of autonomous timing advance determination or the way of non-autonomous timing advance determination. That is, in the process of random access, when the information (such as Msg1, Msg3, MsgA, etc.) is sent to the base station, it is necessary to advance the total timing advance or the difference between the total timing advance and the common timing advance, according to the way of autonomous timing advance determination; or to advance the common timing advance, or to compensate the common timing advance by the network, according to the way of non-autonomous timing advance determination.

In order to guarantee the base station can distinguish different information sent by the same terminal or different terminals during random access, random access resources which are allocated to the terminal for sending Msg1, Msg3, MsgA and other information shall have intervals greater than the possible maximum error of the communication delay, such as the above 20.6 ms. However, the greater the intervals of random access resources become, the lower the density of random access resources and the less the capacity of random access per unit time will be, resulting in a larger scheduling delay.

In the related art, since the base station cannot figure out whether the terminal determines timing advance autonomously or non-autonomously, in order to ensure that the above-mentioned two ways are both applicable for the communication between the base station and the terminal, the base station may configure random access resources for the terminal according to the second way as mentioned above. The terminal may thus send information to the base station based on only this random access configuration information in the process of random access, resulting in the less random access capacity per unit time and the greater scheduling delay.

According to an embodiment of the present disclosure, the base station may send different random access configuration information respectively for the case where the terminal determines timing advance autonomously, or the case where the terminal determines timing advance non-autonomously, so that the terminal can initiate random access based on first random access configuration information when the terminal determines timing advance autonomously, and can initiate random access based on second random access configuration information when the terminal determines timing advance non-autonomously, and the first random access configuration information and the second random access configuration information are different.

That is, in a case where the terminal determines timing advance autonomously and, in a case, where the terminal determines timing advance non-autonomously, random access information such as Msg1, Msg3, MsgA or the like, can be sent to the terminal based on different random access configuration information, so that the terminal does not have to send information to the base station based on only one random access configuration information.

For example, in the case of autonomous timing advance determination, the density of the random access resource corresponding to the first random access configuration information can be relatively large because the possible error of the communication delay may be small, so that the capacity of random access per unit time can be increased and the scheduling delay can be decreased. In the case of non-autonomous timing advance determination, the density of the random access resource corresponding to the second random access configuration information can be relatively small because the possible error of the communication delay may be large, so as to guarantee that the intervals of random access resources accommodate the error of the communication delay.

It should be noted that the relationship between the random access resources corresponding to the first random access configuration information and the random access resources corresponding to the second random access configuration information, is not limited to the above density relationship, and can be set flexibly as needed.

In one embodiment, the first random access configuration information includes, but is not limited to, a configuration for Msg1, a configuration for MsgA, and a configuration for Msg3. The second random access configuration information includes, but is not limited to, a configuration for Msg1, a configuration for MsgA, and a configuration for Msg3. Msg1 refers to the first random access information in the four-step random access process, Msg3 refers to the third random access information in the four-step random access process, and MsgA refers to the random access information sent by the terminal to the base station in the two-step random access process.

FIG. 2 is a schematic flowchart illustrating another random access method in accordance with an embodiment of the present disclosure. As shown in FIG. 2, the method further includes step S102, which is performed prior to S101, previously described.

In step S102, it is determined, according to broadcast signaling and/or Radio Resource Control signaling sent by the base station, that random access is initiated based on first random access configuration information when the terminal determines timing advance autonomously; and/or, it is determined, according to broadcast signaling and/or Radio Resource Control signaling sent by the base station, that random access is initiated based on second random access configuration information when the terminal determines timing advance non-autonomously.

In one embodiment, the base station may instruct the terminal via broadcast signaling, to initiate random access based on the first random access configuration information when timing advance is determined autonomously, or may instruct the terminal via RRC signaling, to initiate random access based on the first random access configuration information when timing advance is determined autonomously.

In one embodiment, the base station may instruct the terminal via broadcast signaling, to initiate random access based on the second random access configuration information when timing advance is determined non-autonomously. The base station may also instruct the terminal via RRC signaling, to initiate random access based on the second random access configuration information when timing advance is determined non-autonomously.

In some examples, the first random access configuration information is for indicating a first random access time domain resource, and the second random access configuration information is for indicating a second random access time domain resource. The first random access time domain resource is different from the second random access time domain resource.

In one embodiment, the first random access configuration information and the second random access configuration information are different, specifically, the first random access time domain resource being different from the second random access time domain resource.

In some examples, density of the first random access time domain resource is different from density of the second random access time domain resource.

In one embodiment, the first random access time domain resource is different from the second random access time domain resource, specifically the density of the first random access time domain resource being different from the density of the second random access time domain resource.

In some examples, the density of the first random access time domain resource is greater than the density of the second random access time domain resource.

In one embodiment, when timing advance is determined autonomously, the density of the first random access time domain resource corresponding to the first random access configuration information may be relatively large due to the possible small errors of the communication delay. Thus, the capacity of the random access per unit time is increased and the scheduling delay is decreased. In a case where timing advance is determined non-autonomously, the density of the second random access time domain resource corresponding to the second random access configuration information can be relatively small due to the possible large error of communication delay. Thus, the intervals of random access resources accommodate the errors of the communication delay.

In some examples, the density of the first random access time domain resource is a first multiple of the density of the second random access time domain resource, where the first multiple is greater than 1.

In one embodiment, the density of the first random access time domain resource may be a first multiple of the density of the second random access time domain resource. That is, in a case where the density of the first random access time domain resource is greater than the density of the second random access time domain resource, the first random access time domain resource and the second random access time domain resource may not be distributed randomly, but may have a certain relationship therebetween.

Accordingly, since the two random access time domain resources have a certain relationship therebetween, the terminal may determine, based on one of the two random access time domain resources, the other random access time domain resource, which is beneficial to reducing the information the base station needs to indicate to the terminal, thereby reducing the occupation of communication resources.

In one embodiment, the terminal may determine the first random access configuration information and the second random access configuration information according to prach-ConfigurationIndex in the signaling sent by the base station. In a case where the density of the first random access time domain resource is the first multiple of the density of the second random access time domain resource, prach-ConfigurationIndex respectively corresponding to the first random access configuration information and the second random access configuration information may be the same, and the terminal can directly determine the first random access time domain resource according to prach-ConfigurationIndex corresponding to the first random access configuration information. However, the second random access time domain resource should be determined according to prach-ConfigurationIndex corresponding to the first random access configuration information and the first multiple indicated by the base station.

FIG. 3 is a schematic flowchart illustrating yet another random access method according to an embodiment of the present disclosure. As shown in FIG. 3, initiating random access based on the second random access configuration information in response to non-autonomous determination of timing advance by the terminal includes steps S1011 and S1012.

In step S1011, a time domain location of the second random access time domain resource is determined according to a time domain location of the first random access time domain resource and the first multiple and an offset.

In step S1012, in response to non-autonomous determination of timing advance by the terminal, random access is initiated at the time domain location of the second random access time domain resource.

In one embodiment, where the density of the first random access time domain resource is the first multiple of the density of the second random access time domain resource, the base station may indicate to the terminal the time domain location of the first random access time domain resource as well as the first multiple and the offset, without the need of indicating the time domain location of the second random access time domain resource to the terminal. The terminal can determine the time domain location of the second random access time domain resource according to the time domain location of the first random access time domain resource and the first multiple and the offset, and further initiates random access at the time domain location of the second random access time domain resource in a case where the terminal determines timing advance non-autonomously.

For example, if the first random access time domain resource is configured at signal frames 0, 1, 2, 3, 4, 5, 6, 7, 8, 9, the density of the first random access time domain resource is 2 times the density of the second random access time domain resource, i.e., the first multiple m=2, and the base station may send the value 2 and the offset to the terminal, or the terminal may pre-store the offset.

For example, if the offset is 1, then signal frames at which the second random access time domain resource is configured is half of the signal frames at which the first random access time domain resource is configured, namely, 0, 2, 4, 6, 8, and then offset by one signal frame, namely 1, 3, 5, 7, and 9.

In some examples, the offset is received from the base station or pre-stored.

In some examples, the first random access configuration information is for indicating a first random access frequency domain resource, and the second random access configuration information is for indicating a second random access frequency domain resource. The first random access frequency domain resource is different from the second random access frequency domain resource.

In one embodiment, the first random access configuration information and the second random access configuration information are different. Specifically, the first random access frequency domain resource indicated by the first random access configuration information being different from the second random access frequency domain resource indicated by the second random access configuration information.

In some examples, the first random access configuration information is for indicating a first frequency domain location of the first random access frequency domain resource, and the second random access configuration information is for indicating a second frequency domain location of the second random access frequency domain resource. Alternatively, the first random access configuration information is for indicating a first frequency domain location of the first random access frequency domain resource, and the second random access configuration information is for indicating a first offset of the second random access frequency domain resource relative to the first frequency domain location. Alternatively, the second random access configuration information is for indicating a second frequency domain location of the second random access frequency domain resource, and the first random access configuration information is for indicating a second offset of the first random access frequency domain resource relative to the second frequency domain location.

In one embodiment, the first frequency domain location of the first random access frequency domain resource may be directly indicated by the first random access configuration information, and the second frequency domain location of the second random access frequency domain resource may be directly indicated by the second random access configuration information.

The first frequency domain location of the first random access frequency domain resource may be also indicated by the first random access configuration information, and the first offset of the second random access frequency domain resource relative to the first frequency domain location may be indicated by the second random access configuration information, so that the terminal can determine the second frequency domain location of the second random access frequency domain resource according to the first frequency domain location and the first offset.

Also, the second frequency domain location of the second random access frequency domain resource may be indicated by the second random access configuration information, and the second offset of the first random access frequency domain resource relative to the second frequency domain location may be indicated by the first random access configuration information. Therefore, the terminal can determine the first frequency domain location of the first random access frequency domain resource based on the second frequency domain location and the second offset.

In some examples, the first random access configuration information is for indicating a first random access preamble and the second random access configuration information is for indicating a second random access preamble. The first random access preamble is different from the second random access preamble.

In one embodiment, the first random access configuration information and the second random access configuration information are different. Specifically, the first random access preamble indicated by the first random access configuration information being different from the second random access preamble indicated by the second random access configuration information.

FIG. 4 is a schematic flowchart illustrating a configuration indication method in accordance with an embodiment of the present disclosure. The method shown in this embodiment can be applied to a base station in a non-terrestrial network, and the base station may be a base station located on the ground in a non-terrestrial network, or a network equipment located in space in a non-terrestrial network, such as a satellite, an aerial platform or the like. The base station may communicate with a terminal serving as a user device, including but not limited to electronic equipment like mobile phones, tablets, wearable devices, sensors, Internet of Things devices or the like. The following is mainly illustrated in the case that the network device is a satellite.

As shown in FIG. 4, the configuration indication method may include the step S201. In step S201, indication information containing first random access configuration information and second random access configuration information is sent. The indication information is for instructing the terminal to initiate random access based on the first random access configuration information when the terminal determines timing advance autonomously, and to initiate random access based on the second random access configuration information when the terminal determines timing advance non-autonomously, and the first random access configuration information is different from the second random access configuration information.

In the related art, since the base station cannot figure out whether the terminal determines timing advance autonomously or non-autonomously, in order to ensure that the above-mentioned two ways are both applicable for the communication between the base station and the terminal, the base station may configure random access resources for the terminal according to the second way as mentioned above, and the terminal may thus send information to the base station based on only this random access configuration information in the process of random access, resulting in the less random access capacity per unit time and the greater scheduling delay.

According to an embodiment of the present disclosure, the base station may transmit different random access configuration information respectively for the case where the terminal determines timing advance autonomously or the case where the terminal determines timing advance non-autonomously, so that the terminal can initiate random access based on first random access configuration information in a case where it determines timing advance autonomously, and can initiate random access based on the second random access configuration information in a case where it determines timing advance non-autonomously, and the first random access configuration information and the second random access configuration information are different.

As such, in a case where the terminal determines the timing advance autonomously, the capacity of random access per unit time is increased and the scheduling delay is decreased. In a case where the terminal determines the timing advance non-autonomously, it is guaranteed that intervals of random access resources accommodate errors of communication delay.

That is, in a case where the terminal determines timing advance autonomously and in a case where the terminal determines timing advance non-autonomously, random access information such as Msg1, Msg3, MsgA or the like, can be sent to the terminal based on different random access configuration information, so that the terminal does not have to send information to the base station based on only one random access configuration information.

For example, in the case of autonomous timing advance determination, the density of the random access resource corresponding to the first random access configuration information can be relatively large because the possible error of the communication delay may be small. Thus, the capacity of random access per unit time can be increased and the scheduling delay can be decreased. In the case of non-autonomous timing advance determination, the density of the random access resource corresponding to the second random access configuration information can be relatively small because the possible error of the communication delay may be large, so as to guarantee that the intervals of random access resources accommodate the error of the communication delay.

In some examples, the indication information is carried in broadcast signaling and/or RRC signaling.

In one embodiment, the base station may instruct the terminal via broadcast signaling to initiate random access based on the first random access configuration information when timing advance is determined autonomously, or may instruct the terminal via RRC signaling to initiate random access based on the first random access configuration information when timing advance is determined autonomously.

In one embodiment, the base station may instruct the terminal via broadcast signaling to initiate random access based on the second random access configuration information when timing advance is determined non-autonomously, and the base station may also instruct the terminal via RRC signaling to initiate random access based on the second random access configuration information when timing advance is determined non-autonomously.

In some examples, the first random access configuration information is for indicating a first random access time domain resource, and the second random access configuration information is for indicating a second random access time domain resource. The first random access time domain resource is different from the second random access time domain resource.

In one embodiment, the first random access configuration information and the second random access configuration information are different, specifically, the first random access time domain resource being different from the second random access time domain resource.

In some examples, density of the first random access time domain resource is different from density of the second random access time domain resource.

In one embodiment, the first random access time domain resource is different from the second random access time domain resource, specifically, the density of the first random access time domain resource being different from the density of the second random access time domain resource.

In some examples, the density of the first random access time domain resource is greater than the density of the second random access time domain resource.

In one embodiment, when timing advance is determined autonomously, the density of the first random access time domain resource corresponding to the first random access configuration information may be relatively large due to the possible small errors of communication delay, so that the capacity of the random access per unit time is increased and the scheduling delay is decreased. In a case where timing advance is determined non-autonomously, the density of the second random access time domain resource corresponding to the second random access configuration information can be relatively small due to the possible large error of communication delay, so that the intervals of random access resources accommodate the errors of communication delay.

In some examples, the density of the first random access time domain resource is a first multiple of the density of the second random access time domain resource, where the first multiple is greater than 1.

In one embodiment, the density of the first random access time domain resource may be a first multiple of the density of the second random access time domain resource. That is, in a case where the density of the first random access time domain resource is greater than the density of the second random access time domain resource, the first random access time domain resource and the second random access time domain resource may not be distributed randomly, but may have a certain relationship therebetween.

Accordingly, since the two random access time domain resources have a certain relationship therebetween, the terminal may determine, based on one of the two random access time domain resources, the other random access time domain resource, which is beneficial to reducing the information the base station needs to indicate the terminal, thereby reducing the occupation of communication resources.

In one embodiment, the base station may indicate the first random access configuration information and the second random access configuration information according to prach-ConfigurationIndex in the signaling. In a case where the density of the first random access time domain resource is the first multiple of the density of the second random access time domain resource, prach-ConfigurationIndex respectively corresponding to the first random access configuration information and the second random access configuration information may be the same, and the terminal can directly determine the first random access time domain resource according to prach-ConfigurationIndex corresponding to the first random access configuration information. However, the second random access time domain resource should be determined according to prach-ConfigurationIndex corresponding to the first random access configuration information and the first multiple indicated by the base station.

In some examples, the indication information is further for instructing the terminal to determine a time domain location of the second random access time domain resource according to a time domain location of the first random access time domain resource and the first multiple and an offset.

In one embodiment, where the density of the first random access time domain resource is the first multiple of the density of the second random access time domain resource, the base station may indicate to the terminal the time domain location of the first random access time domain resource as well as the first multiple and the offset, without the need of indicating the time domain location of the second random access time domain resource to the terminal. The terminal can determine the time domain location of the second random access time domain resource according to time domain location of the first random access time domain resource and the first multiple and offset, and further initiates random access at the time domain location of the second random access time domain resource in a case where the terminal determines timing advance non-autonomously.

For example, if the first random access time domain resource is configured at signal frames 0, 1, 2, 3, 4, 5, 6, 7, 8, 9, the density of the first random access time domain resource is 2 times the density of the second random access time domain resource, i.e., the first multiple m=2, and the base station may send the value 2 and the offset to the terminal, or the terminal may pre-store the offset.

For example, if the offset is 1, then signal frames at which the second random access time domain resource is configured is half of the signal frames at which the first random access time domain resource is configured, namely, 0, 2, 4, 6, 8, and then offset by one signal frame, namely 1, 3, 5, 7, and 9

In some examples, the offset is contained in the indication information, or the offset is pre-stored in the terminal.

In some examples, the first random access configuration information is for indicating the first random access frequency domain resource, and the second random access configuration information is for indicating the frequency domain resource for the second random access. The first random access frequency domain resource is different from the second random access frequency domain resource.

In one embodiment, the first random access configuration information and the second random access configuration information are different, specifically, the first random access frequency domain resource indicated by the first random access configuration information being different from the second random access frequency domain resource indicated by the second random access configuration information.

In some examples, the first random access configuration information is for indicating a first frequency domain location of the first random access frequency domain resource, and the second random access configuration information is for indicating a second frequency domain location of the second random access frequency domain resource. Alternatively, the first random access configuration information is for indicating a first frequency domain location of the first random access frequency domain resource, and the second random access configuration information is for indicating a first offset of the second random access frequency domain resource relative to the first frequency domain location. Alternatively, the second random access configuration information is for indicating a second frequency domain location of the second random access frequency domain resource, and the first random access configuration information is used to indicate a second offset of the first random access frequency domain resource relative to the second frequency domain location.

In one embodiment, the first frequency domain location of the first random access frequency domain resource may be directly indicated by the first random access configuration information, and the second frequency domain location of the second random access frequency domain resource may be directly indicated by the second random access configuration information.

The first frequency domain location of the first random access frequency domain resource may also be indicated by the first random access configuration information, and the first offset of the second random access frequency domain resource relative to the first frequency domain location may be indicated by the second random access configuration information. Therefore, the terminal can determine the second frequency domain location of the second random access frequency domain resource according to the first frequency domain location and the first offset. Also, the second frequency domain location of the second random access frequency domain resource may be indicated by the second random access configuration information, and the second offset of the first random access frequency domain resource relative to the second frequency domain location may be indicated by the first random access configuration information. Therefore, the terminal can determine the first frequency domain location of the first random access frequency domain resource based on the second frequency domain location and the second offset.

In some examples, the first random access configuration information is for indicating a first random access preamble and the second random access configuration information is for indicating a second random access preamble. The first random access preamble is different from the second random access preamble.

In one embodiment, the first random access configuration information and the second random access configuration information are different, specifically, the first random access preamble indicated by the first random access configuration information being different from the second random access preamble indicated by the second random access configuration information.

Corresponding to the aforementioned embodiments of the random access method and the configuration indication method, the present disclosure also provides embodiments of a random access apparatus and a configuration indication apparatus.

FIG. 5 is a schematic block diagram illustrating a random access apparatus 100 according to an embodiment of the present disclosure. The apparatus shown in this embodiment can be applied to a terminal in a non-terrestrial network, the terminal including but not limited to mobile phones, tablets, wearable devices, sensors, Internet of Things devices or the like. The terminal can serve as a user device in communication with a base station, where the base station may be a base station located on the ground in a non-terrestrial network, or a network device located in space in the non-terrestrial network, such as a satellite or an aerial platform or the like. The following is mainly illustrated in the case that the network device is a satellite.

As shown in FIG. 5, the random access apparatus 100 may include: a random access module 101 configured to initiate random access based on first random access configuration information in response to autonomous determination of timing advance by the terminal, to initiate random access based on second random access configuration information in response to non-autonomous determination of timing advance by the terminal. The first random access configuration information is different from the second random access configuration information.

Figure 6:
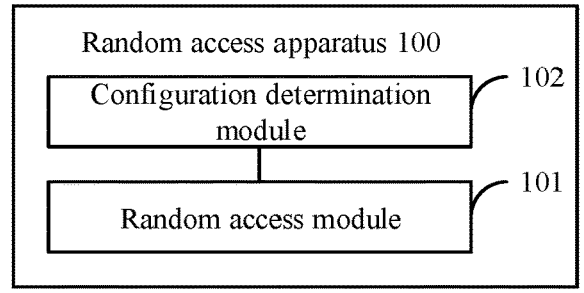
FIG. 6 is a schematic block diagram illustrating another random access apparatus in accordance with an embodiment of the present disclosure.

FIG. 6 is a schematic block diagram illustrating another random access apparatus 100 shown in accordance with an embodiment of the present disclosure. As shown in FIG. 6, the apparatus 100 includes the random access module 101 and further includes a configuration determination module 102.

The configuration determination module 102 is configured to determine, according to broadcast signaling and/or radio resource control signaling sent by a base station, to initiate the random access based on the first random access configuration information in response to the autonomous determination of the timing advance by the terminal. In addition, or alternatively, the configuration determination module 102 determines, according to broadcast signaling and/or radio resource control signaling sent by the base station, to initiate the random access based on the second random access configuration information in response to the non-autonomous determination of the timing advance by the terminal.

In some examples, the first random access configuration information is for indicating a first random access time domain resource, and the second random access configuration information is for indicating a second random access time domain resource. The first random access time domain resource is different from the second random access time domain resource.

In some examples, density of the first random access time domain resource is different from density of the second random access time domain resource. In some examples, the density of the first random access time domain resource is greater than the density of the second random access time domain resource.

In some examples, the density of the first random access time domain resource is a first multiple of the density of the second random access time domain resource, where the first multiple is greater than 1.

In some examples, the random access module is configured to determine a time domain location of the second random access time domain resource according to a time domain location of the first random access time domain resource and the first multiple and an offset; and in response to the non-autonomous determination of the timing advance by the terminal, initiate the random access at the time domain location of the second random access time domain resource.

In some examples, the offset is received from a base station or pre-stored. In some examples, the first random access configuration information is for indicating a first random access frequency domain resource, and the second random access configuration information is for indicating a second random access frequency domain resource. The first random access frequency domain resource is different from the second random access frequency domain resource.

In some examples, the first random access configuration information is for indicating a first frequency domain location of the first random access frequency domain resource, and the second random access configuration information is for indicating a second frequency domain location of the second random access frequency domain resource. Alternatively, the first random access configuration information is for indicating a first frequency domain location of the first random access frequency domain resource, and the second random access configuration information is for indicating a first offset of the second random access frequency domain resource relative to the first frequency domain location. Alternatively, the second random access configuration information is for indicating a second frequency domain location of the second random access frequency domain resource, and the first random access configuration information is for indicating a second offset of the first random access frequency domain resource relative to the second frequency domain location.

In some examples, the first random access configuration information is for indicating a first random access preamble and the second random access configuration information is for indicating a second random access preamble. The first random access preamble is different from the second random access preamble.

Figure 7:
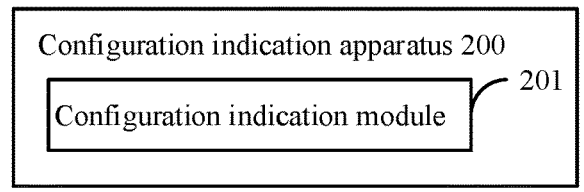
FIG. 7 is a schematic block diagram illustrating a configuration indication apparatus in accordance with an embodiment of the present disclosure.

FIG. 7 is a schematic block diagram illustrating a configuration indication apparatus 200 in accordance with an embodiment of the present disclosure. The apparatus 200 shown in this embodiment can be applied to a base station in a non-terrestrial network, and the base station may be a base station located on the ground in the non-terrestrial network, or a network equipment located in space in a non-terrestrial network, such as a satellite, an aerial platform or the like. The base station may communicate with a terminal serving as a user device, including but not limited to electronic equipment like mobile phones, tablets, wearable devices, sensors, Internet of Things devices or the like. The following is mainly illustrated in the case that the network device is a satellite.

As shown in FIG. 7, the configuration indication apparatus 200 may include a configuration indication module 201, configured to send indication information containing first random access configuration information and second random access configuration information to the terminal. The indication information is for instructing the terminal to initiate random access based on the first random access configuration information when the terminal determines timing advance autonomously, and to initiate random access based on the second random access configuration information when the terminal determines timing advance non-autonomously, the first random access configuration information being different from the second random access configuration information.

In some examples, the indication information is carried in broadcast signaling and/or radio resource control signaling.

In some examples, the first random access configuration information is for indicating a first random access time domain resource, and the second random access configuration information is for indicating a second random access time domain resource. The first random access time domain resource is different from the second random access time domain resource.

In some examples, density of the first random access time domain resource is different from density of the second random access time domain resource. In some examples, the density of the first random access time domain resource is greater than the density of the second random access time domain resource.

In some examples, the density of the first random access time domain resource is a first multiple of the density of the second random access time domain resource, where the first multiple is greater than 1.

In some examples, the indication information is further for instructing the terminal to determine a time domain location of the second random access time domain resource according to a time domain location of the first random access time domain resource and the first multiple and an offset.

In some examples, the offset is included in the indication information, or the offset is pre-stored in the terminal. In some examples, the first random access configuration information is for indicating a first random access frequency domain resource, and the second random access configuration information is for indicating a second random access frequency domain resource. The first random access frequency domain resource is different from the second random access frequency domain resource.

In some examples, the first random access configuration information is for indicating a first frequency domain location of the first random access frequency domain resource, and the second random access configuration information is for indicating a second frequency domain location of the second random access frequency domain resource. Alternatively, the first random access configuration information is for indicating a first frequency domain location of the first random access frequency domain resource, and the second random access configuration information is for indicating a first offset of the second random access frequency domain resource relative to the first frequency domain location. Alternatively, the second random access configuration information is for indicating a second frequency domain location of the second random access frequency domain resource, and the first random access configuration information is for indicating a second offset of the first random access frequency domain resource relative to the second frequency domain location.

In some examples, the first random access configuration information is for indicating a first random access preamble and the second random access configuration information is for indicating a second random access preamble. The first random access preamble is different from the second random access preamble.

Regarding the apparatuses in the foregoing embodiments, the specific manners in which each module performs operations have been described in detail in the embodiments of the related methods, and will not be described in detail herein.

For the apparatus embodiments, since they basically correspond to the method embodiments, reference may be made to the partial description of the method embodiments for related parts. The apparatus embodiments described above are merely illustrative, where the modules described as separate components may or may not be physically separated, and the components shown as modules may or may not be physical modules, that is, they may be located in one place, or may be distributed over multiple network modules. The purpose of the present embodiment may be realized by selecting some or all of the modules according to actual needs. Those of ordinary skill in the art can understand and implement it without paying creative labor.

Embodiments of the present disclosure also provide an electronic device, including a processor, and a memory for storing processor-executable instructions. The processor is configured to implement the random access method described in any one of the above embodiments and/or the configuration indication method described in any one of the above embodiments.

The embodiments of the present disclosure further provide a computer-readable storage medium, on which a computer program is stored, and when executed by the processor implements the steps in the random access method described in any one of the embodiments and/or the configuration indication method described in any one of the embodiments.

Figure 8:
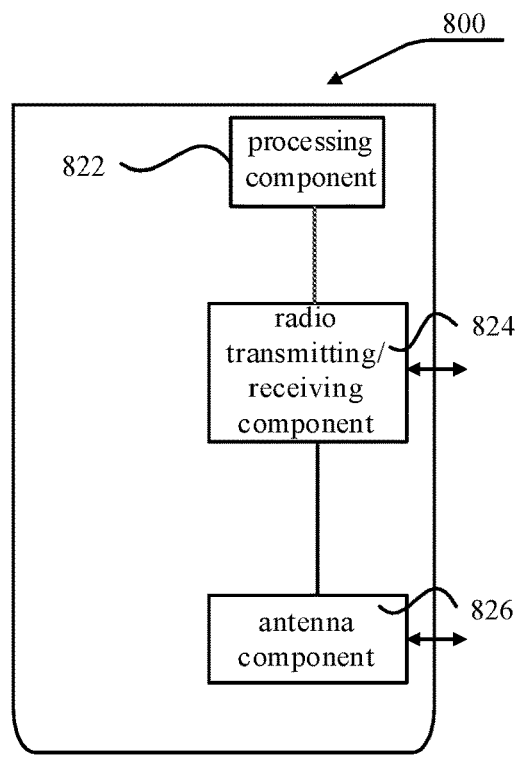
FIG. 8 is a schematic block diagram illustrating a configuration indication apparatus in accordance with an embodiment of the present disclosure.

FIG. 8 is a schematic block diagram illustrating a configuration indication apparatus 800 in accordance with an embodiment of the present disclosure. The apparatus 800 may be provided as a base station. Referring to FIG. 8, the apparatus 800 includes a processing component 822, a radio transmitting/receiving component 824, an antenna component 826, and the processing component 822 may further include one or more processors. One of the processors of the processing component 822 may be configured to implement the configuration indication method as described in any one of the above embodiments.

Figure 9:
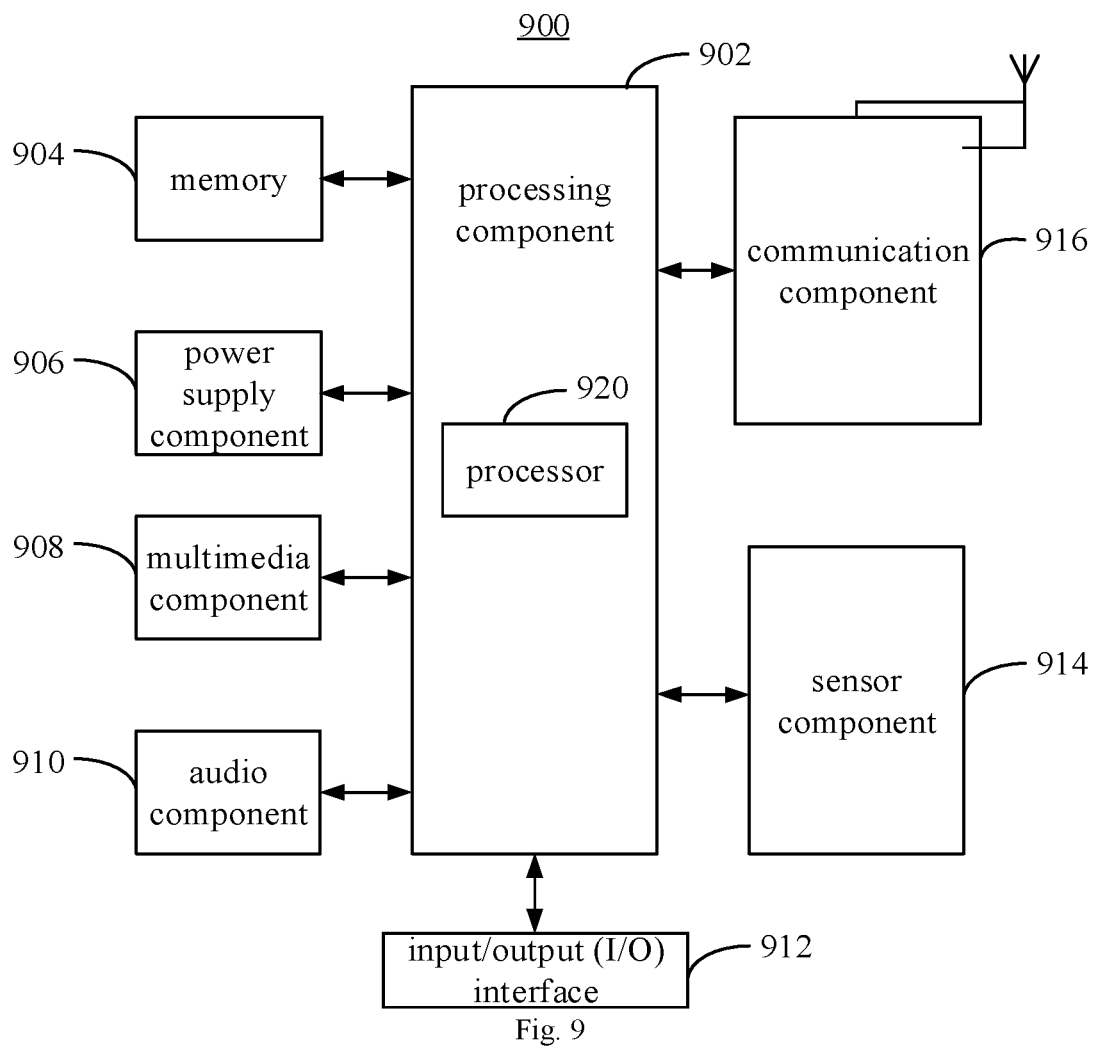
FIG. 9 is a schematic block diagram illustrating a random access apparatus according to an embodiment of the present disclosure.

FIG. 9 is a schematic block diagram illustrating a random access apparatus 900 according to an embodiment of the present disclosure. For example, the apparatus 900 may be a mobile phone, a computer, a digital broadcasting terminal, a messaging device, a game console, a tablet, a medical device, a fitness device, a personal digital assistant, etc.

Referring to FIG. 9, the apparatus 900 may include one or more components of a processing component 902, a memory 904, a power supply component 906, a multimedia component 908, an audio component 910, an input/output (I/O) interface 912, a sensor component 914, and a communication component 916.

The processing component 902 generally controls the overall operation of the apparatus 900, such as operations associated with display, phone calling, data communication, camera operation, and recording operation. The processing component 902 may include one or more processors 920 to execute instructions to execute instructions to perform all or part of the steps of the random access method as described above. Further, processing component 902 may include one or more modules to facilitate interaction between processing component 902 and other components. For example, the processing component 902 may include a multimedia module (not illustrated) to facilitate interaction between the multimedia component 908 and the processing component 902.

The memory 904 is configured to store various types of data to support operations at the apparatus 900. Examples of such data include instructions for any application or method operating on the apparatus 900, contact data, phonebook data, messages, pictures, videos, or the like. Memory 904 may be implemented by any type of volatile or non-volatile storage devices or combinations thereof, such as Static Random Access Memory (SRAM), Electrically Erasable Programmable Read-Only Memory (EEPROM), Erasure Programmable Read-Only Memory (EPROM), Programmable Read-Only Memory (PROM), Read-Only Memory (ROM), Magnetic Memory, Flash Memory, or Optical Disk.

The power supply assembly 906 provides power to various components of the apparatus 900. The power supply assembly 906 may include a power management system, one or more power sources, and other components associated with generating, managing, and distributing power for the apparatus 900.

The multimedia component 908 includes a screen that provides an output interface between the apparatus 900 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, swipe, and gestures on the touch panel. The touch sensor may not only sense the boundaries of a touch or swipe action, but also detect the duration and pressure associated with the touch or swipe action. In some embodiments, the multimedia component 908 includes a front camera and/or a rear camera. When the apparatus 900 is in an operation mode, such as a shooting mode or a video mode, the front camera and/or the rear camera may receive external multimedia data. Each of the front camera and the rear camera can be a fixed optical lens system or have focal length and optical zoom capability.

The audio component 910 is configured to output and or input audio signals. For example, the audio component 910 includes a microphone (MIC) that is configured to receive external audio signals when the apparatus 900 is in an operation mode, such as a call mode, a recording mode, and a voice recognition mode. The received audio signal may be further stored in the memory 904 or transmitted via the communication component 916. In some embodiments, the audio component 910 also includes a speaker for outputting audio signals.

The I/O interface 912 provides an interface between the processing component 902 and a peripheral interface module, which may be a keyboard, a click wheel, a button, or the like. These buttons may include, but are not limited to: home button, volume buttons, start button, and lock button.

The sensor assembly 914 includes one or more sensors for providing status assessment of various aspects for the apparatus 900. For example, the sensor assembly 914 may detect an on/off state of apparatus 900, the relative positioning of components, such as the display and keypad of apparatus 900, and the sensor assembly 914 may also detect a change in the position of the apparatus 900 or a component of the apparatus 900, the presence or absence of user contact with the apparatus 900, the orientation or acceleration/deceleration of the apparatus 900 and the temperature change of apparatus 900. The sensor assembly 914 may include a proximity sensor configured to detect the presence of nearby objects in the absence of any physical contact. The sensor assembly 914 may also include an optical sensor, such as a CMOS or CCD image sensor, for use in imaging applications. In some embodiments, the sensor assembly 914 may also include an acceleration sensor, a gyroscope sensor, a magnetic sensor, a pressure sensor, or a temperature sensor.

The communication component 916 is configured to facilitate wired or wireless communication between the apparatus 900 and other devices. The apparatus 900 may have access to wireless networks based on communication standards, such as WiFi, 2G, or 3G, 4G LTE, 5G NR, or a combination thereof. In one exemplary embodiment, the communication component 916 receives broadcast signals or broadcast-related information from an external broadcast management system via a broadcast channel. In an example, the communication component 916 also includes a Near-Field Communication (NFC) module to facilitate short-range communication. For example, the NFC module can be implemented based on Radio Frequency Identification (RFID) technology, Infrared Data Association (IrDA) technology, ultra-wideband (UWB) technology, Bluetooth (BT) technology, and other technologies.

In an example, the apparatus 900 may be implemented by one or more Application Specific Integrated Circuits (ASIC), Digital Signal Processors (DSP), Digital Signal Processing Devices (DSPD), Programmable Logic Devices (PLD), Field Programmable Door Arrays (FPGA), a controller, a micro-controller, a micro-processor, or other electronic elements to perform the above random access method.

In an example, there is also provided a non-temporary computer-readable storage medium including instructions, such as a memory 904 including instructions that may be executed by the processor 920 of the apparatus 900 to complete the above random access method. For example, the non-temporary computer-readable storage medium may be ROM, Random Access Memory (RAM), CD-ROM, magnetic tape, floppy disk, optical data storage device, or the like.

Other implementations of the present disclosure will be apparent to those skilled in the art from consideration of the specification and practice of the present disclosure herein. The present disclosure is to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the embodiments of the present disclosure are not limited to the precise structure described above and shown in the accompanying drawings, and that various modifications and changes may be made without departing from the scope thereof. The scope of the present disclosure is limited only by the appended claims.

It should be noted that in this document, relational terms such as first and second are only used only to distinguish one entity or operation from another entity or operation, and do not necessarily require or imply any such actual relationship or sequence between such entities or operations. The terms "comprise", "include" and any other variant thereof are intended to cover non-exclusive inclusion so that a process, method, article, or device including a list of elements includes not only those elements, but also other elements not explicitly listed, or other elements inherent to such a process, method, article, or equipment. In the absence of additional restrictions, an element defined by the statement "including a . . . " does not preclude the existence of additional identical elements in a process, method, article, or device including the element.

The methods and apparatuses provided by the embodiments of the present disclosure have been described in detail above, and specific examples are used to illustrate the principles and implementations of the present disclosure. At the same time, for those of ordinary skill in the art, according to the idea of the present disclosure, there will be changes in the specific implementation and application scope. In summary, the content of this specification should not be construed as limitation to the present disclosure.

The invention claimed is:

1. A random access method, being applied to a terminal, the method comprising:
    initiating random access based on first random access configuration information in response to autonomous determination of timing advance by the terminal, initiating random access based on second random access configuration information in response to non-autonomous determination of timing advance by the terminal;
    wherein the first random access configuration information is different from the second random access configuration information;
    the first random access configuration information is for indicating a first random access time domain resource, and the second random access configuration information is for indicating a second random access time domain resource;
    wherein the first random access time domain resource is different from the second random access time domain resource; and
    density of the first random access time domain resource is different from density of the second random access time domain resource.

2. The random access method according to claim 1, wherein the random access method further comprises at least one of:
    determining, according to broadcast signaling and/or radio resource control signaling sent by a base station, to initiate the random access based on the first random access configuration information in response to the autonomous determination of the timing advance by the terminal; or
    determining, according to broadcast signaling and/or radio resource control signaling sent by the base station, to initiate the random access based on the second random access configuration information in response to the non-autonomous determination of the timing advance by the terminal.

3. The random access method according to claim 1, wherein the density of the first random access time domain resource is greater than the density of the second random access time domain resource.

4. The random access method according to claim 1, wherein the density of the first random access time domain resource is a first multiple of the density of the second random access time domain resource, wherein the first multiple is greater than 1.

5. The random access method according to claim 4, wherein initiating the random access based on the second random access configuration information in response to the non-autonomous determination of the timing advance by the terminal, comprises:
    determining a time domain location of the second random access time domain resource according to a time domain location of the first random access time domain resource and the first multiple and an offset; and
    in response to the non-autonomous determination of the timing advance by the terminal, initiating the random access at the time domain location of the second random access time domain resource, and
    wherein the offset is received from a base station or pre-stored.

6. The random access method according to claim 1, wherein the first random access configuration information is for indicating a first random access frequency domain resource, and the second random access configuration information is for indicating a second random access frequency domain resource;
    wherein the first random access frequency domain resource is different from the second random access frequency domain resource.

7. The random access method according to claim 6, wherein the first random access configuration information is for indicating a first frequency domain location of the first random access frequency domain resource, and the second random access configuration information is for indicating a second frequency domain location of the second random access frequency domain resource; or
    the first random access configuration information is for indicating the first frequency domain location of the first random access frequency domain resource, and the second random access configuration information is for indicating a first offset of the second random access frequency domain resource relative to the first frequency domain location; or the second random access configuration information is for indicating the second frequency domain location of the second random access frequency domain resource, and the first random access configuration information is for indicating a second offset of the first random access frequency domain resource relative to the second frequency domain location.

8. The random access method according to claim 1, wherein the first random access configuration information is for indicating a first random access preamble, and the second random access configuration information is for indicating a second random access preamble;

wherein the first random access preamble is different from the second random access preamble.

9. A configuration indication method, being applied to a base station, the configuration indication method comprising:

sending indication information containing first random access configuration information and second random access configuration information to a terminal;

wherein the indication information is for instructing the terminal to initiate random access based on the first random access configuration information in response to that the terminal determines timing advance autonomously, and to initiate random access based on the second random access configuration information in response to that the terminal determines timing advance non-autonomously, the first random access configuration information being different from the second random access configuration information;

the first random access configuration information is for indicating a first random access time domain resource, and the second random access configuration information is for indicating a second random access time domain resource;

wherein the first random access time domain resource is different from the second random access time domain resource; and density of the first random access time domain resource is different from density of the second random access time domain resource.

10. The configuration indication method according to claim 9, wherein the indication information is carried in at least one of: broadcast signaling or radio resource control signaling.

11. The configuration indication method according to claim 9, wherein the density of the first random access time domain resource is greater than the density of the second random access time domain resource, and wherein the density of the first random access time domain resource is a first multiple of the density of the second random access time domain resource, wherein the first multiple is greater than 1.

12. The configuration indication method according to claim 11, wherein the indication information is further for instructing the terminal to determine a time domain location of the second random access time domain resource according to a time domain location of the first random access time domain resource and the first multiple and an offset;

wherein the offset is comprised in the indication information, or the offset is pre-stored in the terminal.

13. The configuration indication method according to claim 9, wherein the first random access configuration information is for indicating a first random access frequency domain resource, and the second random access configuration information is for indicating a second random access frequency domain resource;

wherein the first random access frequency domain resource is different from the second random access frequency domain resource.

14. The configuration indication method according to claim 13, wherein the first random access configuration information is for indicating a first frequency domain location of the first random access frequency domain resource, and the second random access configuration information is for indicating a second frequency domain location of the second random access frequency domain resource; or the first random access configuration information is for indicating the first frequency domain location of the first random access frequency domain resource, and the second random access configuration information is for indicating a first offset of the second random access frequency domain resource relative to the first frequency domain location; or the second random access configuration information is for indicating the second frequency domain location of the second random access frequency domain resource, and the first random access configuration information is for indicating a second offset of the first random access frequency domain resource relative to the second frequency domain location.

15. The configuration indication method according to claim 9, wherein the first random access configuration information is for indicating a first random access preamble, and the second random access configuration information is for indicating a second random access preamble;

wherein the first random access preamble is different from the second random access preamble.

16. An electronic device, comprising:

a memory for storing processor-executable instructions;

one or more processors that are communicatively coupled to the memory wherein the one or more processors are collectively configured to:

initiate random access based on first random access configuration information in response to autonomous determination of timing advance by a terminal, initiating random access based on second random access configuration information in response to non-autonomous determination of timing advance by the terminal, and wherein the first random access configuration information is different from the second random access configuration information;

the first random access configuration information is for indicating a first random access time domain resource, and the second random access configuration information is for indicating a second random access time domain resource;

wherein the first random access time domain resource is different from the second random access time domain resource; and density of the first random access time domain resource is different from density of the second random access time domain resource.

* * * * *